United States Patent [19]

Winther

[11] Patent Number: 4,531,473
[45] Date of Patent: Jul. 30, 1985

[54] SERVICE TOOL FOR PRESSURE INDICATING VALVE

[76] Inventor: Harry Winther, Box 359 Quaker Neck Rd., Chestertown, Md. 21620

[21] Appl. No.: 484,617

[22] Filed: Apr. 13, 1983

[51] Int. Cl.$^3$ ............................................. B60C 23/02
[52] U.S. Cl. ................................. 116/34 R; 73/146.8
[58] Field of Search ................ 116/34 R, 34 A, 34 B; 73/146.2, 146.3, 146.8; 81/15.4; 152/431

[56] References Cited

U.S. PATENT DOCUMENTS

| | | | |
|---|---|---|---|
| 1,446,504 | 2/1923 | Howell | 81/15.4 |
| 1,460,027 | 6/1923 | Maddock | 81/15.4 |
| 3,824,849 | 7/1974 | Foxhall | 73/146.8 |
| 3,827,393 | 8/1974 | Winther | 116/34 R |

Primary Examiner—Charles Frankfort
Assistant Examiner—Patrick Scanlon
Attorney, Agent, or Firm—Eugene E. Renz, Jr.

[57] ABSTRACT

A service tool for a valve and visual low pressure indicating assembly for a pressurized container and particularly of a type adapted for operative association with a pneumatic vehicle tire, while being applicable generally to other containers enclosing a fluid under pressure. The pressure indicating valve and assembly serves as means for insertion, or removal, of fluid under pressure from the container, but further, and of substantial significance, serves to externally visually indicate a condition of low or diminished fluid pressure within a tire or other container. The new pressure indicating valve assembly constitutes a replacement for known valve structures and, due to an entirely different construction and operation, creates a need for the tool structure of the present invention, to implement and facilitate servicing of the novel pressure indicating valve structure assembly.

3 Claims, 4 Drawing Figures

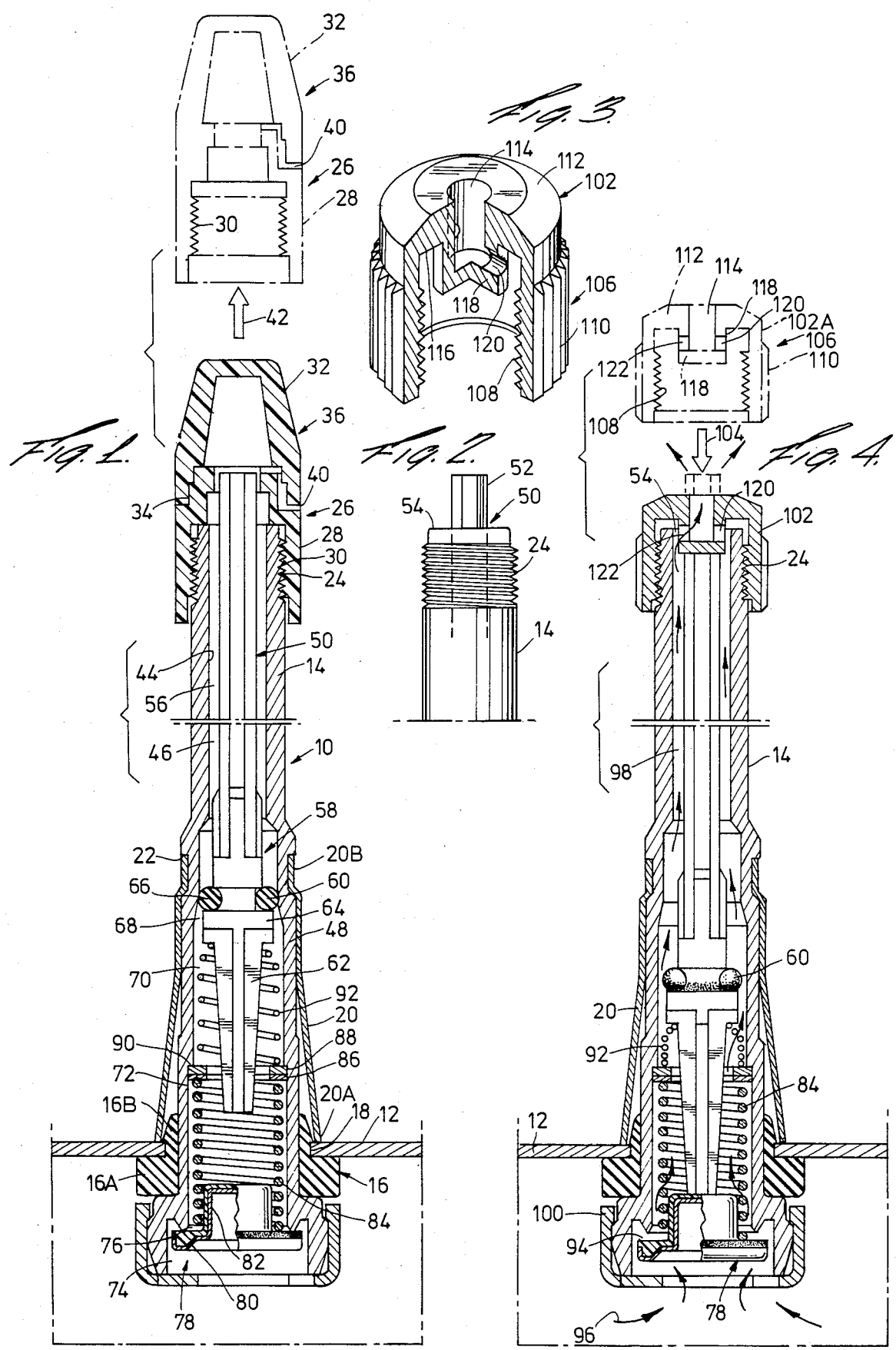

SERVICE TOOL FOR PRESSURE INDICATING VALVE

BACKGROUND OF THE INVENTION

The present invention relates generally to service tools to facilitate servicing of a new pressure indicating valve assembly means. The new visual pressure indicating valve means constitutes a replacement for known valve means, particularly as applied to pneumatic vehicle tires, although otherwise useful for any containers for pressurized fluid, and especially valves for introducing or releasing fluid under pressure into or from the container.

Types of valves have long been in use and are well known in the art. Restricting the present description, for simplicity, while at the same time rendering a full and complete understanding of differences existing between known types of valves and the present structure, the description of known valves will refer to those types which are currently standard in use with pneumatic vehicle tires. These include a valve stem or housing body adapted for mounting on a wheel rim, and operatively opening into the interior of an associated tire. The stem at the opposite end is open to permit tire pressure testing, introduction and/or removal of air from the tire. A valve core having a central depressable spring biased pin is operatively screw threadedly mounted within the valve stem. For this purpose the valve core has an externally threaded median portion adapted for screw threaded engagement with internal threads in the valve stem, for placement and retention therein. The spring biased central pin normally has valving means at its lower end, or at an intermediate position, which is engageable with a valve seat in the outer peripheral portion of the valve stem or housing, and through which the central pin is movably mounted.

The spring biasing means tend to hold the central pin so that valving means carried thereby is in sealing engagement with the valve seat in the valve stem. The pin is depressable either by an operator's hand digit, or some extraneous tool or piece of material to release contact between the valving means and the valve seat. Circumstances leading to such depression and disassociation include (1) introduction of air into a tire or container casing, (2) checking of pressure of a fluid such as within the container by known types of pressure gauges, and which frequently contain as a portion thereof a central pin depressor, and (3) removal of the pressurized air or fluid from the container for any desired purpose. It is further known in the art that such valve stems normally include an externally threaded upper end on which a safety cap is adapted for screw threaded engagement. It is also known in the art that means for introducing air or fluid under pressure into a container or tire will usually include, as a portion thereof, means for depressing the central pin to permit effecting a desired service.

The known types of valve cores normally include, on their upper end, upstanding lugs which are usually diametrically opposed and which are engageable by a bifurcated end tool, such as found on some tire valve safety caps or separate tools, engageable with the upstanding lugs for turning or screwing placement of, or removal of, the core from the valve stem. These known types of valve tools or implements are not optimally operable to service a pressure indicating valve means assembly of the type contemplated by the present invention.

Visual pressure indicating valve means of the type contemplated by the invention, and broadly referred to hereinabove, are disclosed generally in detail in my prior U.S. Pat. Nos. 3,717,845, 3,827,393, and 3,828,149. A further and important embodiment of a pressure indicating valve means devised and invented by the present applicant is disclosed in detail in his copending application Ser. No. 182,606, filed Aug. 29, 1980, now abandoned and entitled VEHICLE TIRE DEFLATION SIGNALING SYSTEM. The disclosures of the prior patents, and the pending application are incorporated in the present application by reference thereto.

A single embodiment of a workable structure will be shown and described in the present application for the purpose of showing and describing the design and function of such visual pressure indicating valve, and the necessity or desirability of the present service tool for facilely servicing the same. The distinction over known tools, and/or devices commonly in use in connection with known valve structures, will be obvious from the accompanying drawing, and description which follows.

Basically, the pressure indicator and valve means, which utilizes the present service tool, includes a structure having an extendable member which is actuated to extend an end visually from the valve means when air or fluid pressure within a vehicle tire, or container, reaches a point or condition lower than a desired operating condition. The visual indicating means is, in operation, visually exposed by extension from the valving means stem by operation of a spring biased or controlled poppet valve mechanism, adapted to move to an indicating position upon a predetermined decrease in pressure within the container. The indicating means is thereupon partially extended from the valving means by air pressure within the container in coaction with calibrated spring biasing means within the valving structure.

The present invention accordingly is directed to a new and novel service tool for facilely servicing a pressure indicating valve means of a new and novel construction, as regards known prior art types, and which tool has unique characteristics and features which enhance ease of servicing and use of the pressure indicating valve means.

The service tool of the invention is of a simple and inexpensive construction, and is easily operable by a user for servicing a container having operably mounted thereto a visual pressure indicating valve means as contemplated by the invention. The service tool, when pressed (friction held) or threaded on the valve will open an air flow passage greater than the flow area of a standard tire valve with its core removed.

The service tool of the invention improves tire servicing mainly in three ways:

(1) Eliminates the need to unthread and remove a valve core during tire change, (2) Reduces possibility of creating a leak path when reinstalling a valve core that could be dirty, damaged or improperly installed, and (3) Saves time because the tool is easier to use than standard valve core tools, and opens a greater air flow passage.

BRIEF DESCRIPTION OF THE DRAWINGS

For purposes of illustrating the present tool and the type of valving means with which the tool is to be used, reference is made to the accompanying drawings, in which:

FIG. 1 is a sectional view through a visual pressure indicating valve assembly structure contemplated by the invention, as mounted to a container, such as a vehicle tire rim, and disclosing the internal structural features thereof, illustrating the desirability of the servicing tool of the present invention, the figure disclosing in solid lines a protective cap affixed to the upper end of the valving means structure, and in phantom lines a removed cap;

FIG. 2 is a fragmentary side elevational view of the uppermost portion of a pressure indicating valving means assembly, disclosing the indicator means in the extended position;

FIG. 3 is a fragmentary perspective view, a portion being in section for clarity, of the service tool of the present invention adapted for facile servicing of a pressure indicating valve means of the new type construction; and FIG. 4 is a view generally similar to FIG. 1, with the safety cap removed, and disclosing in full lines a juxtaposed functional positionment of the tool of the invention in association with the indicator valving means mechanism, and in phantom lines the servicing tool in a displaced or removed position.

DETAILED DESCRIPTION OF THE DRAWINGS

Referring initially to FIG. 1 of the drawings, a visual pressure indicating valve means as contemplated by the invention is indicated generally at 10. This valving means is shown operatively mounted to a container wall member 12, which can be a vehicle wheel tire rim, partially shown, for example. This corresponds to the known positionment of valving means in rim mounted pneumatic tire constructions for vehicles. The valving means broadly includes an elongated hollow cylindrical housing 14, or valve stem which is similar to that of known valve structures. Operative mounting of the valving means utilizes a rubber grommet 16, having a portion 16A positioned against the interior of a container wall, or between a tire rim 12 and tire, and in sealing engagement therewith. The grommet 16 includes a collar portion 16B which extends through an opening 18 in a wall or rim 12 in a usual manner. A valve retainer clip 20 coacts with and between the upper surface of rim 12 and the body of the cylindrical housing or stem 14. The clip has a lower end 20A which is in engagement with the upper surface of the rim surrounding the opening 18. The clip 20 additionally includes an upper end 20B in operative engagement within a groove or depression 22 in the cylindrical housing 14. The clip serves to position and interengage the valve member structure with the rim. Other attachments such as threaded members can be used, in a known manner.

The upper end of housing or stem 14 is externally threaded proximate the upper end at 24, for intergageable connection of a usual type cap assembly, generally designated 26. This cap assembly 26 includes a lower skirt portion 28 which is internally threaded at 30 for operative coaction with the threads 24. The cap assembly further includes an upper end closed portion 32 which is intimately interconnected at 34 with lower portion 28. The combination of portions 28 and 32 constitute a safety cap, designated 36 for clarity, both of which are preferably transparent plastic material. The outer longitudinal periphery of the lower portion can include ribs or serrations, not shown, to facilitate placement and/or removal of the cap from the body. As shown in FIGS. 1 and 2, a bleed or leakage passageway 40 is arranged in the cap assembly. The function of this passageway is to provide for pressure equilization between the valve body and the cap, and additionally to permit a slight bleeding of a small amount of normal escapement air provided for in the construction, and through passageways or tolerances provided, not shown. This slight air escapement requires no additional detailed explanation herein since not constituting a part of the present invention. The transparency is provided so that a low pressure indicating portion of the valve member assembly will be externally visible, even with the usual safety cap in place on the valve member. The interior of the overall cap 32 is configured to accommodate portions of the valve means upper end. This is shown in FIG. 1.

Additionally, as shown in FIG. 1, the cap 32 is adapted for removal from the upper end of the valve means as indicated by arrow 42, a removed position being shown in phantom lines in this figure. This, as usual, permits servicing of a tire or introduction or removal of air from the tire or a container.

While the operating mechanism of a low pressure indicating valve for which the present tool has been devised, is shown and described in substantial detail in my aforementioned application for patent, Ser. No. 182,606, to which reference is herein made for a detailed disclosure, the basics of the mechanism will be broadly described hereinafter, reference being made to the drawings.

The valve stem 14 has a hollow interior 44 with a smaller diameter upper end 46 and an outwardly flared or geometrically configured lower end 48. An indicator piston generally indicated at 50 is operatively inserted within the stem. This indicator piston has an upper indicator end 52 preferably of an attention-inviting color, such as red, which, under a pressure condition within the container or tire being lower than desired will extend outwardly from and beyond the top 54 of stem or housing 14. This will be referred to in greater detail hereinafter.

FIG. 1 shows the normal condition of the various portions of the valve assembly under normal conditions with a predetermined fluid pressure being within the container or tire. The indicator piston, in this condition, is retracted or in a withdrawn position. It is to be noted that the exterior of the upper portion of indicator piston 50 is spaced from the hollow interior wall 44 of the stem as indicated at 56. This spacing provides an air passage which will be explained with reference to FIG. 4 of the drawings. The indicator piston 50 includes an intermediate portion generally designated 58, and to which there is affixed or attached an O-ring 60 of a usual known type. The indicator piston 50 additionally includes, as a portion thereof, a downward extension 62 having a generally taperingly decreasing configuration as clearly seen in FIG. 1. It is to be noted that O-ring 60 is positioned on or above a cap or upper rim portion 64 of extension 62. The O-ring 60 in the normal pressure condition depicted in FIG. 1 is in sealing engagement at 66 at the uppermost end of a generally conically shaped portion 68 proximate the lower end of the valve stem interior. The lower end of the section 68 terminates in an enlarged cylindrical portion 70 of the stem. The stem interior beneath or below the portion 70 again widens into an enlarged lower cylindrical end or cavity 72. The lowermost end of stem 14 terminates in a valve poppet compartment 74 and includes an inwardly directed shoulder 76 which constitutes a valve seat for a poppet valve assembly generally designated 78. The poppet valve includes a seal 80 of resilient material such as a rubber disc for sealingly engaging with shoulder 76. An inner upper extending portion 82 of the poppet valve assembly body can include a portion of the sealing material 80 as shown in conjunction with a stiffening body portion. This construction serves as a seat for a spring 84, the upper end of which engages with a washer 86 and spacer 88 in engagement with a surface 90, formed at the juncture point between the cylindrical portions 70,72. The spring 84 is compressively disposed between the valve poppet and the inward shoulder means 90 at the juncture point above mentioned. The spring as so mounted is operable under low air pressure conditions in the container or tire to move the poppet valve assembly downwardly from the position shown in FIG. 1 to that shown in FIG. 2. The spring is so designed that the actuating force thereof is compatible with a predesigned or devised interior pressure condition in the container or tire, and will serve upon a decrease in this pressure to extend or remove the poppet valve from sealing engagement with the inwardly directed sealing shoulder 76.

A return spring 92 having a predetermined strength is interposed between the top of spacer 90 and the undersurface of the rim portion 64 of downward extension 62 of indicator piston 50. This return spring 92 constitutes and functions as a second biasing means, to return the piston to its normal position as shown in FIG. 1, following an intentional depression of the indicator piston 50, such as when taking a pressure reading, bleeding air from or introducing air into the container or tire to again assume the sealing position of the poppet assembly. Reiterating, the closed and sealed condition of the valve is shown in FIG. 1 which is commensurate with a predetermined air pressure within the container to which attached.

When pressure within the container is reduced below a predetermined value, the poppet valve, due to the force of first biasing means constituted by spring 84, is moved away from sealing engagement between shoulder 76 and seal 80. This condition is shown in FIG. 4, and results in the formation of an air flow passage or gap 94. When this condition occurs, air within the container will flow, as indicated by arrows 96, from the container and through gap 94 and upwardly within the interior of stem 14 and through passageway 98 formed between the exterior of indicator piston 50 and stem 14. The flow of air is clearly depicted by the arrows 96 if followed from the lower extremity of the valve up through the passage 98 and thence, in the absence of a closure and sealing cap at 32, the air will pass through the open top 54 of the stem or housing. It is to be noted that a poppet retainer 100 prevents disengagement of the poppet valve means from the remainder of the valve structure.

FIG. 2 discloses the condition resulting from the lower pressure condition in the container, with the indicator piston rising such that the indicator end 52 extends above the upper end of stem 14, and will visually indicate to a vehicle operator or the like the undesired or lower pressure condition existing.

Under certain operational conditions such as, for example, the lowered pressure in the container, a desire to accurately check the pressure in the container, or in order to bleed air from the container or introduce additional air into the container, then depression of the indicator piston 50 and release of the sealing condition of the poppet valve is required.

As above mentioned, the usual known valve cap such as at 32, or a modified form thereof having the bifurcated end, or other tool for use with the valve and visual low pressure indicating assembly for a pressurized container as shown is not available. The service tool 102, shown in greater detail in FIG. 3, is especially designed to satisfy or fulfill this requirement or need. The service tool, generally designated 102 is shown in detail in FIGS. 3 and 4, in the latter Figure being shown in operative position in full lines and a removed or inoperative position in phantom lines at 102a. The arrow 104 indicates application of the tool to the valve assembly.

The tool 102 is constituted by a hollow depending skirt 106 which preferably is interiorly threaded at 108 for coaction, in the operative mounted condition of FIG. 4, to coact with the threads at 24 on stem 14. This construction permits an operator to mount the tool on the stem and leave the immediate area. Under some circumstances the internal threads 108 can be omitted and a slip fit provided but this requires the presence of an operator. The exterior of skirt 106 can be provided with a knurled surface at 110 to facilitate application or removal of the tool from the stem. The tool is additionally provided with a closure end 112 having a central opening 114 therethrough. Extending below the underside 116 of closure end 112 is a closed end cylinder 118. Air passageways or channels 120,122 are formed through the sidewall of cylinder 118.

When the service tool is to be used for one of the purposes aforementioned, it is placed on the upper end of stem 14 as indicated by arrow 104 in FIG. 4. When this takes place, the closure end of cylinder 118 engages with the upper end of indicator piston 50 and upon downward displacement of the cap, the indicator piston is moved downwardly in the housing or stem 14 into the condition shown in FIG. 4. At that time, it is possible to release the air pressure within the container due to passage of the air through the passageway as indicated by the arrows, to bleed air from the container. If desired a usual filler connection end from an air supply source can be used to force air into the container until a desired pressure therein is obtained.

While a single embodiment of the service tool of the present invention has been shown and described in detail, manifestly changes in minor structural details thereof is possible without departing from the spirit and scope of the invention as defined in and solely limited by the appended claims.

I claim:

1. A valve and low-pressure indicator assembly for a pressurized container comprising:
   (a) a tubular housing having an interior wall, an upper end and a downwardly facing seat;
   (b) a valve poppet cooperating with the seat;
   (c) spring means biasing the valve poppet away from the seat, the spring means being overcomeable by air pressure within the pressurized container above a preestablished pressure;
   (d) mounting means intermediate the level of the seal and the upper end of the housing for mounting the valve assembly to the pressurized container;

(e) said poppet and seat being located and protected inside the pressurized container;

(f) an indicator piston having a free end reciprocable in the housing and having an upper portion adapted to be seen and indicate low pressure, the piston having an upper position for indicating, a lower position for venting, and a normal position intermediate the two, the piston having a downward extension adapted to engage the poppet and forcibly open it when the piston is moved manually down to the lower position, the piston sealingly engaging the interior wall of the housing except in the venting position; whereby when the pressure in the container drops, the poppet opens and the piston is driven to the indicating position and whereby from the upper end of the housing the container may be vented by pressing down the piston to open the poppet, and gauged or filled by placing a gauge or filling chuck over the top of the housing and pressing the piston down to open the poppet;

a service tool for said valve and low-pressure indicator assembly comprising:

(g) a hollow-cap detachably and depressibly mounted on the upper end of said housing;

(h) said cap including a depending hollow cylinder having a closed end and a fluid flow side opening therethrough;

(i) said closed end of said cylinder being operatively contactable with the free end of said indicator piston for depressing said indicator piston to move the piston to a depressed position to open a fluid passage around said piston and through the upper end of the housing to thereby permit desired venting or complete fluid exhaustion from the container.

2. A service tool as claimed in claim 1, wherein said fluid flow side opening comprises at least two passages through a side of said cylinder to facilitate intercommunication of the interior of said housing with the interior of said cylinder and enhanced fluid passage to the exterior of said housing.

3. A service tool as claimed in claim 1, said cap including internal threading for coactive engagement with an external threaded portion on said housing.

* * * * *